United States Patent
Konishi

(10) Patent No.: US 8,494,034 B2
(45) Date of Patent: Jul. 23, 2013

(54) COMMUNICATION DEVICE AND COMMUNICATION SYSTEM

(75) Inventor: Yasuaki Konishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 261 days.

(21) Appl. No.: 13/010,206

(22) Filed: Jan. 20, 2011

(65) Prior Publication Data

US 2012/0069875 A1    Mar. 22, 2012

(30) Foreign Application Priority Data

Sep. 21, 2010   (JP) ................. 2010-211295

(51) Int. Cl.
*H04B 1/38*       (2006.01)
(52) U.S. Cl.
USPC ........... 375/219; 375/222; 375/373; 375/375; 375/376
(58) Field of Classification Search
USPC ................. 375/219, 222, 373, 375, 376
See application file for complete search history.

(56) References Cited

U.S. PATENT DOCUMENTS

| | | | |
|---|---|---|---|
| 2001/0055331 A1* | 12/2001 | Agazzi et al. | 375/216 |
| 2010/0103994 A1* | 4/2010 | Frans et al. | 375/221 |

FOREIGN PATENT DOCUMENTS

JP     A-8-8811     1/1996

\* cited by examiner

*Primary Examiner* — Shuwang Liu
*Assistant Examiner* — Ross Varndell

(57) ABSTRACT

A communication device includes: a reception unit that receives a signal transmitted from another communication device via a transmission path; a transmission unit that transmits a signal to the another communication device via the transmission path; an error rate measurement unit that measures an error rate representing a probability of occurrence of errors in a signal received by the reception unit in a case where a bi-directional communication with the another communication device is performed; and a phase adjustment unit that adjusts a phase of a signal transmitted from the transmission unit to the another communication device based on an error rate measured by the error rate measurement unit.

9 Claims, 15 Drawing Sheets

FIG. 5

| PHASE DIVISION NUMBER | BER IN Rx2a | BER IN Rx3a |
|---|---|---|
| 1 | $10^{-5}$ | $10^{-11}$ |
| 2 | $10^{-6}$ | $10^{-12}$ |
| 3 | $10^{-9}$ | $10^{-12}$ |
| 4 | $10^{-11}$ | $10^{-11}$ |
| 5 | $10^{-12}$ | $10^{-9}$ |
| 6 | $10^{-12}$ | $10^{-6}$ |
| 7 | $10^{-11}$ | $10^{-5}$ |
| 8 | $10^{-9}$ | $10^{-5}$ |
| 9 | $10^{-6}$ | $10^{-6}$ |

COMMUNICATION DEVICE AND COMMUNICATION SYSTEM

CROSS-REFERENCE TO RELATED APPLICATION

This application is based on and claims priority under 35 USC 119 from Japanese Patent Application No. 2010-211295 filed on Sep. 21, 2010.

BACKGROUND (i) Technical Field

The present invention relates to a communication device and a communication system.

(ii) Related Art

Recently, communication devices such as transceivers performing a serial transmission in the order of Gbps have been known. Two communication devices perform a bi-directional communication via a cable such as S/FTP (Shielded/Foiled Twisted Pair) for example.

SUMMARY

According to an aspect of the present invention, there is provided a communication device including: a reception unit that receives a signal transmitted from another communication device via a transmission path; a transmission unit that transmits a signal to the another communication device via the transmission path; an error rate measurement unit that measures an error rate representing a probability of occurrence of errors in a signal received by the reception unit in a case where a bi-directional communication with the another communication device is performed; and a phase adjustment unit that adjusts a phase of a signal transmitted from the transmission unit to the another communication device based on an error rate measured by the error rate measurement unit.

BRIEF DESCRIPTION OF THE DRAWINGS

Exemplary embodiments of the present invention will be described in detail based on the following figures, wherein:

FIG. 5 is a diagram illustrating an example of an error information table in accordance with the first exemplary embodiment;

DETAILED DESCRIPTION

A description will now be given, with reference to the accompanying drawings, of exemplary embodiments of the present invention.

[First Exemplary Embodiment]

Figure 1:
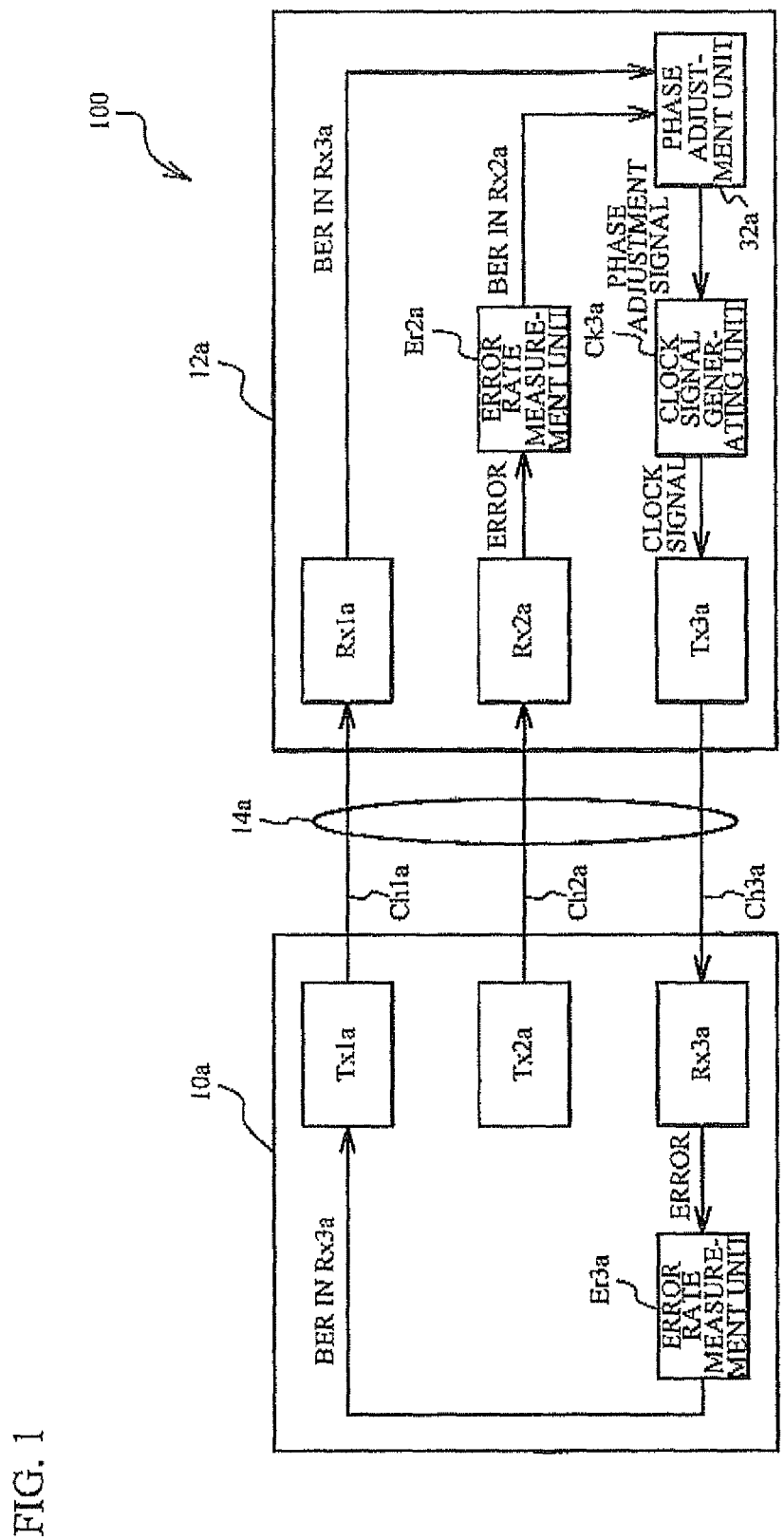
FIG. 1 is a block diagram illustrating a composition of a communication system in accordance with a first exemplary embodiment terminal schematically.

FIG. 1 is a block diagram illustrating a composition of a communication system 100 in accordance with a first exemplary embodiment schematically. As illustrated in FIG. 1, the communication system 100 is provided with a communication device 10a, a communication device 12a, and a transmission path 14a. Communication devices 10a and 12a are transceivers for example. The transmission path 14a couples the communication device 10a with the communication device 12a. The communication device 10a and the communication device 12a perform a bi-directional full-duplex communication that transmits a signal bi-directionally via the transmission path 14a. The transmission path 14a includes three channels Ch1a, Ch2a and Ch3a. The transmission path 14a is an S/FTP cable for example, and channels Ch1a, Ch2a and Ch3 correspond to respective electric cables in the S/FTP cable. In a description hereinafter, assume that it is preliminarily known that a BER (Bit Error Rate) in a transmitted signal increases in order of Ch1a, Ch3a and Ch2a when a signal is transmitted bi-directionally in channels Ch1a, Ch2a, and Ch3a.

The communication device 10a is provided with transmission units Tx1a and Tx2a, a reception unit Rx3a, and an error rate measurement unit Er3a. Transmission units Tx1a and Tx2a transmit signals to the communication device 12a via channels Ch1a and Ch2a provided to the transmission path 14a respectively. The transmission unit Tx1a transmits a BER in a signal received by the reception unit Rx3a of the communication device 10a to the communication device 12a. The reception unit Rx3a receives a signal transmitted from the communication device 12a via the channel Ch3a. The error rate measurement unit Er3a measures a BER which represents a probability of occurrence of errors in the signal received by the reception unit Rx3a in a case where a bi-directional communication with the communication device 12a is performed.

The communication device 12a is provided with reception units Rx1a and Rx2a, a transmission unit Tx3a, an error rate measurement unit Er2a, a phase adjustment unit 32a, and a clock signal generating unit Ck3a. Reception units Rx1a and Rx2a receive signals transmitted from the communication device 10a via channels Ch1a and Ch2a respectively. The reception unit Rx1a receives the BER in the signal received by the reception unit Rx3a of the communication device 10a from the communication device 10a. The transmission unit Tx3a transmits a signal to the communication device 10a via the channel Ch3a provided to the transmission path 14a. The error rate measurement unit Er3a measures a BER in a signal received by the reception unit Rx3a in a case where a bi-directional communication with the communication device 10a is performed. The clock signal generating unit Ck3a generates a clock signal which functions as a standard of timing at which the transmission unit Tx3a transmits a signal, and provides the clock signal to the transmission unit Tx3a. The phase adjustment unit 32a adjusts a phase of a signal, which is to be transmitted from the transmission unit Tx3a to the communication device 10a, based on the BER in the reception unit Rx2a measured by the error rate measurement unit Er2a and the BER in the reception unit Rx3a received by the reception unit Rx1a from the transmission unit Tx1a of the communication device 10a. The phase adjustment unit 32a provides a phase adjustment signal, which adjusts a phase of the clock signal, to the clock signal generating unit Ck3a.

Figure 2:
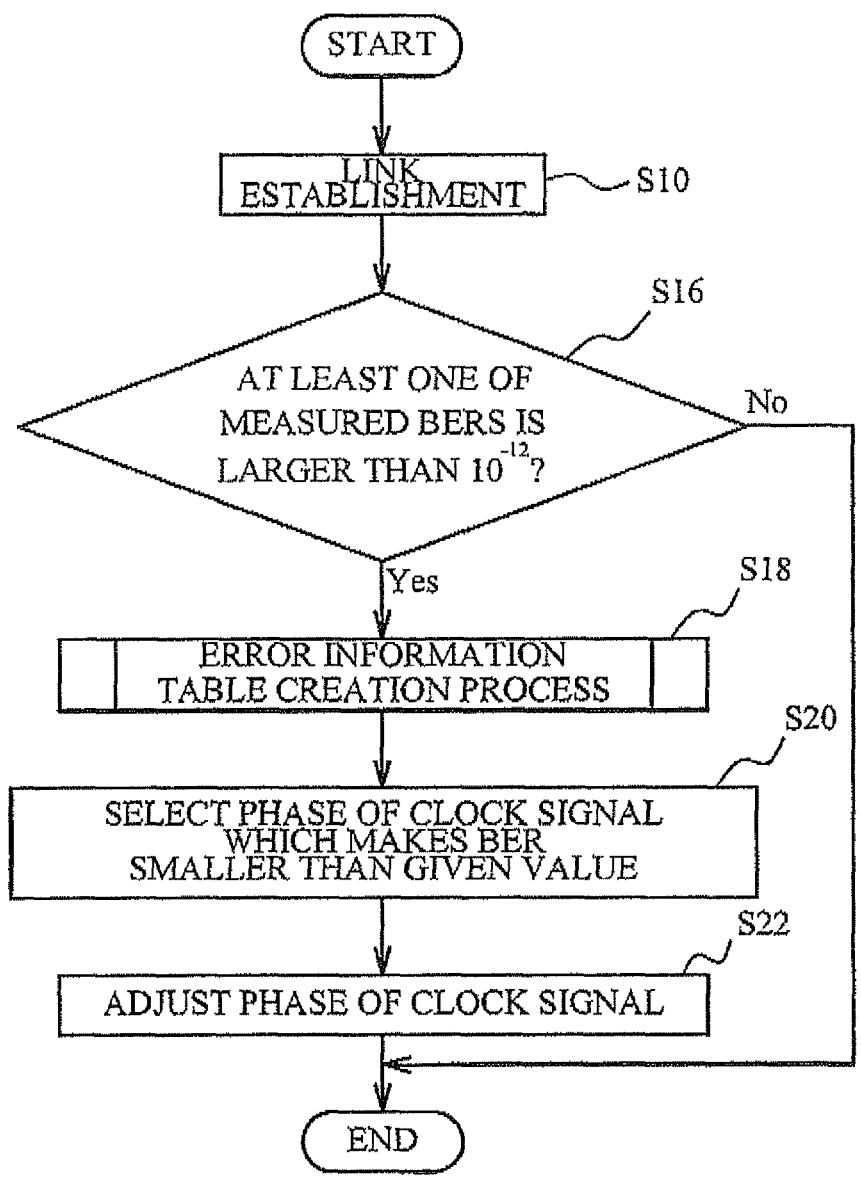
FIG. 2 is a flowchart illustrating a process of adjusting a phase of a signal transmitted from a transmission unit in a communication device in accordance with the first exemplary embodiment.

FIG. 2 is a flowchart illustrating a process of adjusting a phase of a signal transmitted from the transmission unit Tx3 in the communication device 12a in accordance with the first exemplary embodiment.

As illustrated in FIG. 2, a link establishment of channels is carried in ascending order of the BER (step S10). When the BER in a signal to be transmitted increases in order of channels Ch1a, Ch1a and Ch2a, the reception unit Rx1a receives a signal from the transmission unit Tx1a first. Then, the transmission unit Tx3a transmits a signal to the reception unit Rx3a. Finally, the reception unit Rx2a receives a signal from the transmission unit Tx2a. A link establishment with the process described above enables the communication device 10a and the communication device 12a to communicate with each other.

The phase adjustment unit 32a determines whether at least one of measured BERs is larger than $10^{-12}$ (step S16). When at least one of measured BERs is larger than $10^{-12}$, the phase adjustment unit 32a determines Yes in the step S16. When the determination of the step S16 is No, the process is ended. In the example of FIG. 1, the phase adjustment unit 32a determines whether the BER in the reception unit Rx2a measured by the error rate measurement unit Er2a is larger than $10^{-12}$ or the BER in the reception unit Rx3a measured by the error rate measurement unit Er3a is larger than $10^{-12}$. Here, the value $10^{-12}$ which is used as a standard for determining the magnitude of the BER is an example, and may be other values.

When the determination of the step S16 is Yes, the phase adjustment unit 32a creates an error information table (step S18). The phase adjustment unit 32a refers to the created error information table, selects a phase of a clock signal that makes the BER smaller than a given value, and defines the selected phase as a first phase (step S20). The phase adjustment unit 32a transmits a phase adjustment signal to the clock signal generating unit Ck3a and adjusts the clock signal so that the phase of the clock signal becomes the first phase (step S22). Details of procedures of steps S18 and S20 will be described later.

Figure 3:
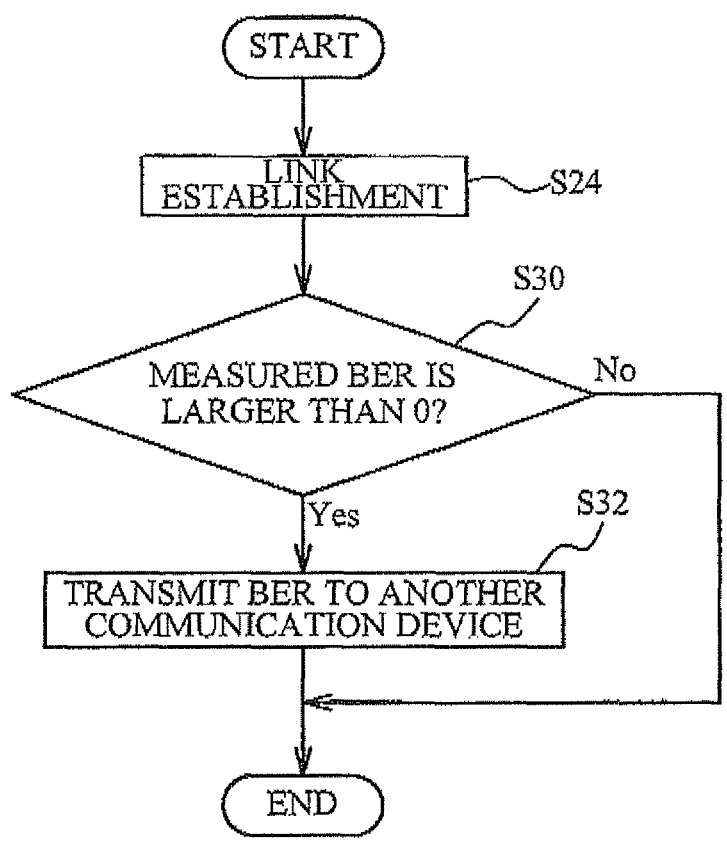
FIG. 3 is a flowchart illustrating a process of transmitting a BER in a reception unit to the communication device.

FIG. 3 is a flowchart illustrating a process of transmitting the BER in the reception unit Rx3 to the communication device 12a in the communication device 10a, in accordance with the first exemplary embodiment.

As illustrated in FIG. 3, the step S24 is a procedure corresponding to a link establishment procedure of the step S10 in the communication device 12a, and a link establishment of channel is carried out in ascending order of the BER in the same manner as the step S10. When the BER in a signal to be transmitted increases in order of channels Ch1a, Ch3a and Ch2a, the transmission unit Tx1a transmits a signal to the reception unit Rx1a first. Then, the reception unit Rx3a receives a signal from the transmission unit Tx3a. Finally, the transmission unit Tx2a transmits a signal to the reception unit Rx2a.

The error rate measurement unit Er3a determines whether the measured BER is larger than 0 (step S30). When the communication device 10a is provided with error rate measurement units, error rate measurement units determine whether any of measured BERs is larger than 0 in the step S30. When the measured BER is larger than 0, the error rate measurement unit Er3a determines Yes in the step S30. When the determination of the step S30 is No, the process is ended. When the determination of the step S30 is Yes, the error rate measurement unit Er3a transmits the measured BER to the reception unit Rx1a of the communication device 12a, which is an example of another communication device via, the transmission unit Tx1a (step S32).

Figure 4:
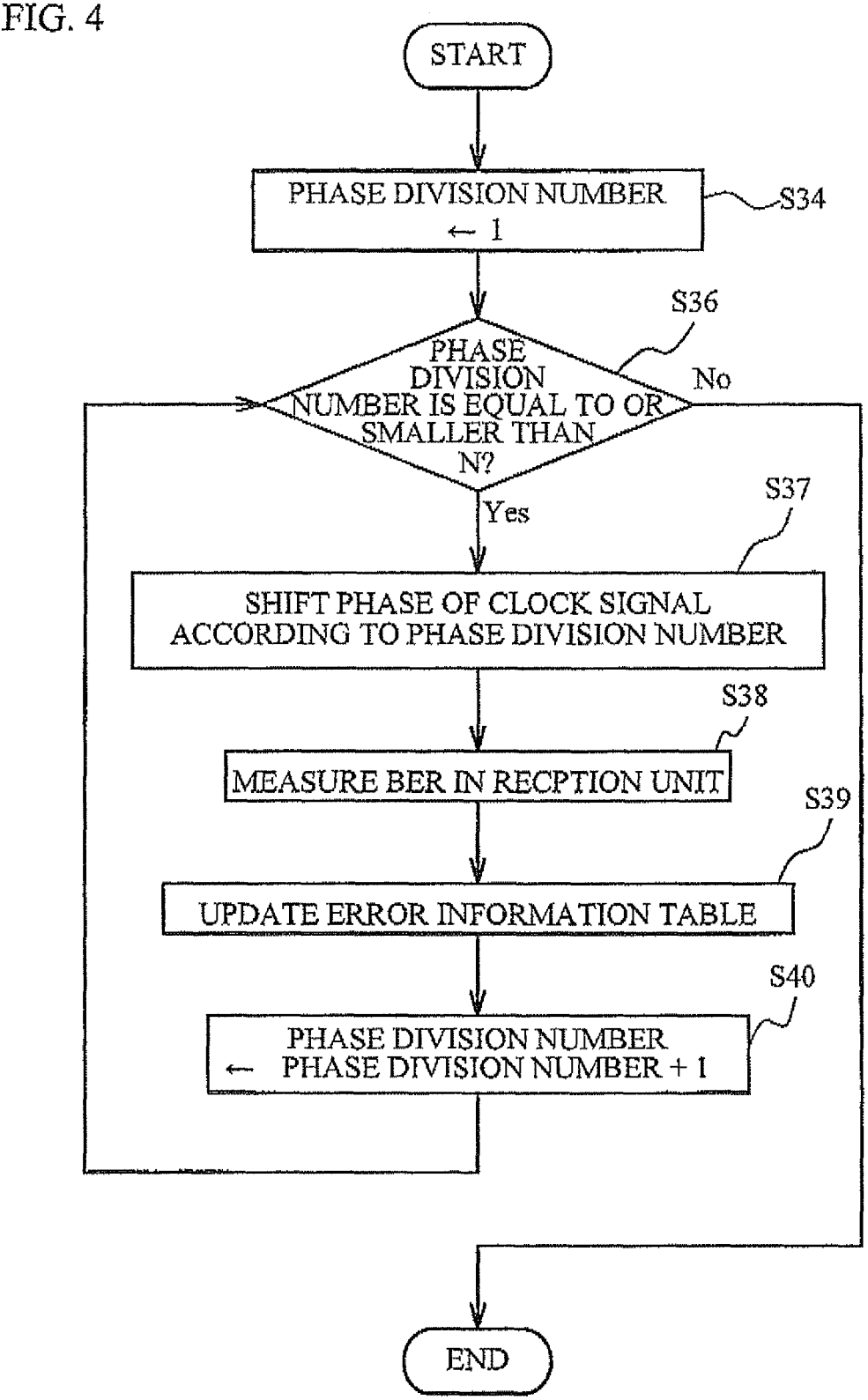
FIG. 4 is a flowchart illustrating an error information table creation process in a phase adjustment unit in accordance with the first exemplary embodiment.

FIG. 4 is a flowchart illustrating an error information table creation process in the phase adjustment unit 32a in accordance with the first exemplary embodiment. The error information table creation process corresponds to the process of the step S18 in FIG. 2.

The error information table is a table indicating a correspondence relationship between a phase shift of the clock signal and the BER in the reception unit. Hereinafter, a description will be given of a case where 360°, which is a phase of one period, is equally divided in N and the error information is created by measuring the BERs in reception units with respect to N different phase shifts of the clock signal. Hereinafter, assume that N is nine. Numbers 1 through 9 are assigned in ascending order of phase of the clock signal as a phase division number. For example, when the phase division number is 1, this means that the phase of the clock signal is shifted by 40°. When the phase division number is 4, this means that the phase of the clock signal is shifted by 160° (=40°×4).

As illustrated in FIG. 4, the phase adjustment unit 32a sets 1 to the phase division number (step S34), and initializes the phase division number. The phase adjustment unit 32a determines whether the phase division number is equal to or smaller than N (step S36). When the phase division number is equal to or smaller than N, the determination of the step S36 becomes Yes. When the determination of the step S36 is Yes, the phase adjustment unit 32a transmits a phase adjustment signal to the clock signal generating unit 34a according to the phase division number, and shifts the phase of the clock signal (step S37). According to this, the phase of the signal transmitted from the transmission unit Tx3a is shifted by the phase shift of the clock signal. Error rate measurement units Er2a and Er3a measure BERs in reception units Rx2a and Rx3a respectively (step S38), and notifies the phase adjustment unit 32a of measured BERs. The phase adjustment unit 32a updates the error information table by using the phase division number and BERs corresponding to the phase division number in reception units Rx2a and Rx3a (step S39). The phase adjustment unit 32a increments the phase division number (step S40), and goes back to the step S36. The procedures of steps S37, S38, S39 and S40 are repeated N times. When the phase division number exceeds N (step S36/No), the process is ended.

FIG. 5 is a diagram illustrating an example of the error information table in accordance with the first exemplary embodiment. Each row of the error information table in FIG. 5 indicates BERs in reception units Rx2a and Rx3a with respect to the phase division numbers 1 through 9. For example, the row of which the phase division number is 1 indicates that the BER in the reception unit Rx2a is $10^{-5}$ and the BER in the reception unit Rx3a is $10^{-11}$ in a case where the phase of the clock signal is shifted by 40°.

A description will now be given of a case where the process of the step S32 indicated in FIG. 2 is executed by the phase adjustment unit 32a with the error information table in FIG. 5. For example, assume that a given BER is $10^{-11}$. According to the error information table in FIG. 5, when the phase division number is 4, both the BER in the reception unit Rx2a and the BER in the reception unit Rx3a become equal to or smaller than $10^{-11}$. Therefore, the phase adjustment unit 32a selects 4 among the phase division numbers 1 through 9. The phase shift corresponding to the phase division number 4 is 160°. The phase adjustment unit 32a adjusts the phase of the clock signal so that the phase shift of the clock signal becomes 160°.

A description will now be given of another case where the process of the step S32 indicated in FIG. 2 is executed by the phase adjustment unit 32a with the error information table in FIG. 5. Here, assume that a given BER is $10^{-12}$. In this case, the phase division number where both the BER in the reception unit Rx2a and the BER in the reception unit Rx3a become equal to or smaller than $10^{-12}$ does not exist. Thus, the process is executed by using $10^{-11}$, which is a large value next to $10^{-12}$, as a given value. In this case, in the same manner as the above example, 4 is selected as the phase division number, and the phase adjustment unit 32a adjusts the phase of the clock signal so that the phase shift of the clock signal becomes 160°.

Figure 6:
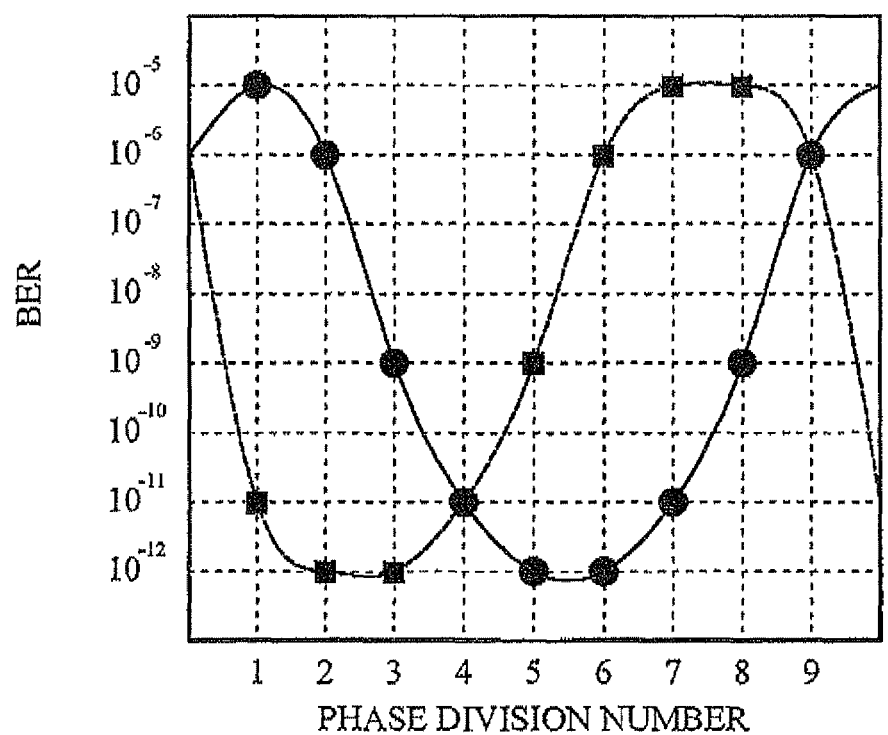
FIG. 6 is a diagram illustrating a graph based on the error information table in accordance with the first exemplary embodiment.

FIG. 6 is an example of a graph based on the error information table in accordance with the first exemplary embodiment, and illustrates the error information table in FIG. 5 with a graph. A vertical axis and a horizontal axis in FIG. 6 represent a phase division number and a BER respectively. Black circles and black squares represent BERs in the reception unit Rx2a and BERs in the reception unit Rx3a respectively. A solid line connecting black circles represents an approximate curve based on BERs in the reception with Rx2a. A dashed line connecting black squares represents an approximate curve based on BERs in the reception unit Rx3a.

A description will now be given of a case where the process of the step S20 indicated in FIG. 2 is executed by the phase adjustment unit 32a with a graph in FIG. 6. For example, assume that a given BER is $10^{-11}$. According to the graph in FIG. 6, when the phase division number is 4, both the BER in the reception unit Rx2a and the BER in the reception unit Rx3a become equal to or smaller than $10^{-11}$. Thus, the phase adjustment unit 32a selects 4 among the phase division numbers 1 through 9. The phase adjustment unit 32a adjusts the phase of the clock signal so that the phase shift of the clock signal becomes 160°. Here, the phase of the clock signal may be adjusted by using the approximate curve. For example, in a case where the phase division number is 3.5 where both BER in the reception unit Rx2a and the BER in the reception unit Rx3a become equal to or smaller than $10^{-11}$, the phase of the clock signal may be adjusted so that the phase shift of the clock signal becomes 140° (=40°×3.5).

Figure 7:
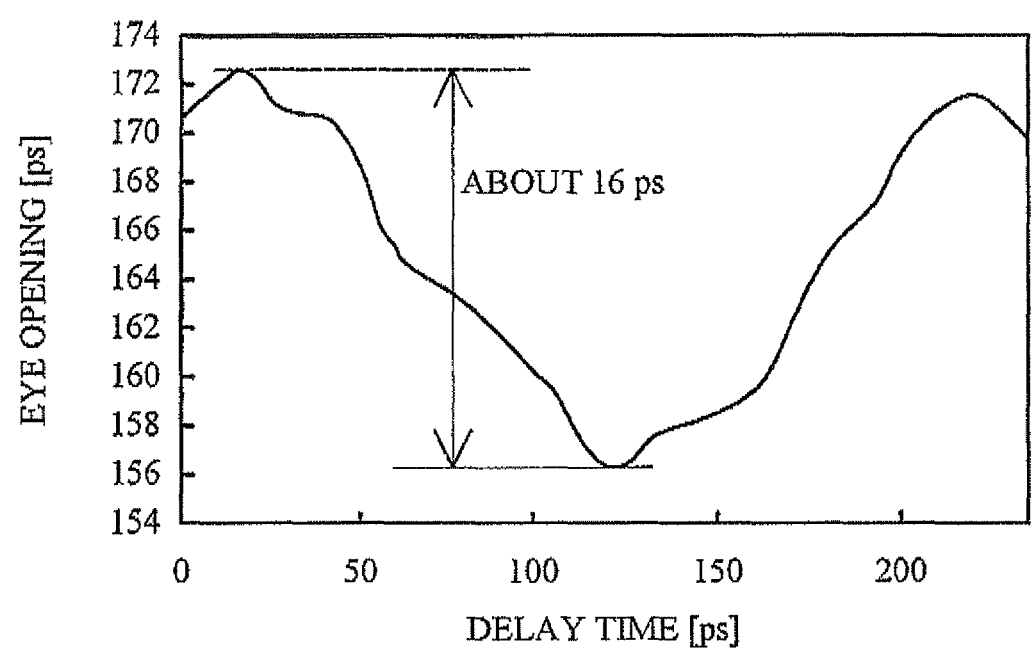
FIG. 7 is a graph illustrating an experiment result of change of an eye opening of an eye pattern in a case where a phase of a signal is adjusted by the phase adjustment unit in accordance with the first exemplary embodiment.

FIG. 7 is a graph indicating an experimental result of change of an eye opening of eye-pattern in a case where the phase of the signal is adjusted by the phase adjustment unit 32a in accordance with the first exemplary embodiment. In FIG. 7, a vertical axis represents an eye opening [ps], and a horizontal axis represents a delay time corresponding to the phase shift [ps]. In this experiment, the transmission rate of a signal between communication devices is 5 Gbps. When the transmission rate of a signal between communication devices is 5 Gbps, one period is 200 [ps]. FIG. 7 indicates a result of the measurement of change of the eye opening by changing the phase shift for one period. As illustrated in FIG. 7, the eye opening is improved by 16 ps by adjusting the phase of the signal by the phase adjustment unit 32a.

As described above, according to the first exemplary embodiment, the communication device 12a is provided with reception units Rx1a and Rx2a that receive signals transmitted from another communication device 10a via the transmission path 14a, the transmission unit Tx3a that transmits a signal to another communication device 10a via the transmission path 14, the error rate measurement unit Er2a that measures the BER, which represents a probability of occurrence of errors in signals received by reception units Rx1a and Rx2a, in a case where the bi-directional communication with another communication device 10a is performed, and the phase adjustment unit 32a that adjusts the phase of the signal, which is to be transmitted from the transmission unit Tx3a to another communication device 10a, based on the BER measured by the error rate measurement unit Er2a. When the bi-directional communication is performed between communication devices via channels of the transmission path, a near-end crosstalk occurs. As the degree of electrical connection between channels that communicate bi-directionally becomes larger, a near-end crosstalk becomes large easily. When the transmission occurs because of a near-end crosstalk described above, an effect of a near-end crosstalk is suppressed by adjusting the phase of the signal transmitted by the transmission unit Tx3a based on the BER measured in each channel as described in the first exemplary embodiment.

In the first exemplary embodiment, a description was given of a case where the error rate measurement unit Er2a measures error rates of signals received by reception units Rx1a and Rx2a with respect to phases that the phase adjustment unit 32a adjusts as described in steps S34, S36, S37, S38, S39 and S40 in FIG. 4. A description was given of a case where the phase adjustment unit 32a selects the first phase, which makes error rates become equal to or smaller than a given value, among phases as described in the step S20 of FIG. 2, and adjusts the phase of the signal transmitted from the transmission unit to another communication device 10a to the first phase as described in the step S22 of FIG. 2. In FIG. 5 and FIG. 6, a description was given of a case where the first phase becomes a phase which is shifted by a phase corresponding to the phase division number 4 (160°). In FIG. 5, a description was given of an example of the error information table, but the format of the error information table may be other formats. Instead of the error information table in FIG. 5, a phase of a signal transmitted by the transmission unit may be adjusted by using the approximate curve illustrated in FIG. 6. In the first exemplary embodiment, the number dividing the phase is 9, but may be other numbers. The number dividing the phase may be increased. As the increase of the number dividing the phase causes the increase of the number of measurements of error rate, an accuracy of the approximate curve illustrated in FIG. 6 is improved, and an accuracy of adjustment of the phase of the signal transmitted by the transmission unit is improved. The number dividing the phase may be decreased. As the decrease of the number dividing the phase causes the decrease of the number of measurements of error rate, the processing load of the communication device is reduced.

In the first exemplary embodiment, a description was given of a case where reception units Rx1a and Rx2a receive the error rate of a signal received by another communication device 10a from another communication device 10a. A description was given of a case where the phase adjustment unit 32a adjusts the phase of the signal, which is to be transmitted from the transmission unit Tx3a to another communication device 10a, based on the BER measured by the error rate measurement unit Er2a and the BER in a signal received by another communication device 10a (the BER measured by the error rate measurement unit Er3a). As the phase of the signal is adjusted relatively, it is not necessary to provide the phase adjustment unit to both of communication devices communicating with each other, which means that the phase adjustment unit may be provided to either one of communication devices. The phase adjustment unit may be provided to both of communication devices communicating with each other.

In the first exemplary embodiment, a description was given of a ease where it is preliminarily known that the BER of the signal to be transmitted increases in order of channels Ch1a, Ch3a and Ch2a in a case where the bi-directional communication is performed in channels Ch1a, Ch2a and Ch3a. In this case, to examine the effect of a near-end crosstalk in each channel, a link establishment is carried out in order of channels Ch1a, Ch3a and Ch2a, and the BERs in the transmission of channels Ch2a and Ch1a are measured under the condition that the transmission in the channel Ch1a is being performed. Thus, when the BER in each channel is preliminarily known, it is not necessary to provide the error rate measurement unit that measures the BER in the reception unit Rx1a as illustrated in FIG. 1. The error rate measurement unit that measures the BER in the reception unit Rx1a may be provided and the measured BER may be used for the process in the phase adjustment unit 32a.

In the first exemplary embodiment, a description was given of a case where the clock signal generating unit Ck3a that generates a clock signal which functions as a standard of timing at which the transmission unit Tx3a transmits a signal is provided, and the phase adjustment unit 32a adjusts the phase of signal which is to be transmitted from the transmission unit Tx3a to another communication device 10a by adjusting the phase of the clock signal. According to this composition, the phases of signals to be transmitted by transmission units are adjusted by adjusting the clock signal in a case where transmission units transmit signals in synchronization with the clock signal generated by one clock signal generating unit. As phases of signals transmitted by transmission units are adjusted without providing a number of phase adjustment units, the cost of the communication device may be reduced compared to a case where the composition of the first exemplary embodiment is not provided. The phase adjustment signal of the phase adjustment unit 32a may be notified to the transmission unit Tx3a, and the transmission unit Tx3a may adjust the phase of the signal, which is to be transmitted, directly.

As described above, according to the first exemplary embodiment, the communication system 100 is provided with the transmission path 14a that couples a first communication device 10a with a second communication device 12a and through which the first communication device 10a and the second communication device 12a transmit signals bi-directionally, a first reception unit Rx3a that receives a signal transmitted from the second communication device 12a via the transmission path 14a, first transmission units Tx1a and Tx2 that transmit signals to the second communication device 12a via the transmission path 14a, and the first error rate measurement unit Er3a that measures an error rate, which represents a probability of occurrence of errors in a signal received by the first reception unit Rx3a, in a case where the bi-directional communication with the second communication device 12a is performed. First transmission units Tx1a and Tx2a is provided with the first communication device 104 that transmits a first error rate to the second communication device 12a, and a second communication device 12a. The second communication device 12a includes second reception units Rx1a and Rx2a that receive the signal and the first error rate transmitted from the first communication device 10a via the transmission path 14a, second transmission unit Tx3a that transmits a signal to the first communication device 10a via the transmission path 14a, a second error rate measurement unit Er2a that measures a second error rate, which represents a probability of occurrence of errors in signals received by second reception units Rx1a and Rx2a in a case where the bi-directional communication with the first communication device 10a is performed, and the phase adjustment unit 32a that adjusts the phase of the signal, which is to be transmitted from the second transmission unit Tx3a to the first communication device 10a, based on the first error rate and the second error rate. When the transmission error occurs because of a near-end crosstalk, the effect of a near-end crosstalk is suppressed by adjusting the phase of the signal transmitted by the transmission unit Tx3a based on the BERs measured in channels as described in the first exemplary embodiment.

In the first exemplary embodiment, a description was given of a case where the error rate measurement unit Er3a of the communication device 10a transmits the BER in the reception unit Rx3a to the reception unit Rx1a of the communication device 12a via the transmission unit Tx1a. When the effect of a near-end crosstalk in each channel is known, it is preferable to use the channel of which the BER is lower in a case where the BER in one of communication devices is notified to the other of communication devices.

[Second Exemplary Embodiment]

Figure 8:
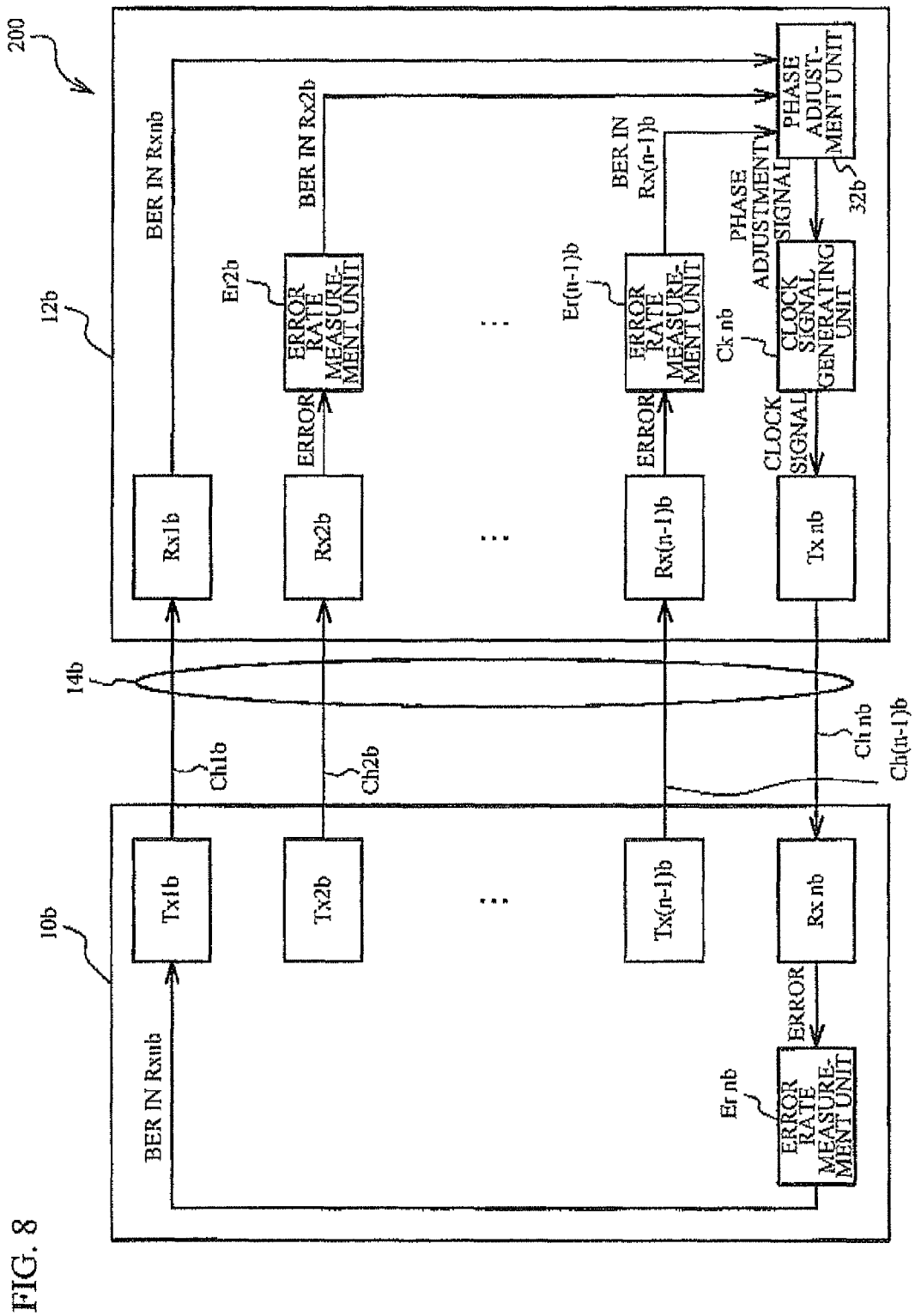
FIG. 8 is a block diagram illustrating a composition of a communication system in accordance with a second exemplary embodiment schematically.

FIG. 8 is a block diagram illustrating a composition of a communication system 200 in accordance with a second exemplary embodiment schematically. The communication system 200 is different from the communication system 100 in that the number of channels of the transmission path is n. Hereinafter, a description about the same composition as that of the first exemplary embodiment will be omitted.

As illustrated in FIG. 8, the communication system 200 is provided with the communication device 10b, the communication device 12b and the transmission path 14b. The transmission path 14a includes n-channels Ch1b, Ch2b, . . . , Ch(n−1)b and Ch nb.

The communication device 10h is provided with (n−1)-transmission units Tx1b, Tx2b, . . . , and Tx(n−1)b, a reception unit Rx nb, and an error rate measurement unit Er nb. Transmission units Tx1b, Tx2b, . . . , and Tx(n−1)b transmit signals to the communication device 12b via channels Ch1b, Ch2b, . . . , and Ch(n−1)b respectively. The transmission unit Tx1b transmits the BER in a signal received by the reception unit Rx nb to the communication device 12b. The reception unit Rx rib receives a signal transmitted from the communication device 12b via the channel Ch nb. The error rate measurement unit Er rib measures the BER in a signal received by the reception unit Rx nb in a case where a bi-directional communication with the communication device 12b is performed.

The communication device 12b is provided with (n−1)-reception units Rx1b, Rx2b, . . . , and Rx(n−1)b, a transmission unit Tx nb, (n−2)-error rate measurement units Er2b through Er(n−1)b, a phase adjustment unit 32b, and a clock signal generating unit Ck nb. Reception units Rx1b, Rx2b, . . . , and Rx(n−1)b receive signals transmitted from the communication device 10b via channels Ch1b, Ch2b, - - - , and Ch(n−1)b respectively. The reception unit Rx1b receives the BER in a signal received by Rx nb of the communication device 10b from the communication device 10b. The transmission unit Tx nb transmits a signal to the communication device 10b via the channel Ch nb. Error rate measurement units Er2b through Er(n−1)b measure BERs in signals received by reception units Rx2b through Rx(n−1)b in a case where a bi-directional communication with the communication device 10b is performed. The clock signal generating unit Ck nb generates a clock signal which functions as a standard of timing at which the transmission unit Tx nb transmits a signal, and provides the clock signal to the transmission unit Tx nb. The phase adjustment unit 32b adjusts the phase of the signal, which is to be transmitted from the transmission unit Tx nb to the communication device 10b, based on the BERs in reception units Rx2b through Rx(n−1)b that error rate measurement units Er2b through Er(n−1)b measured and the BER in the reception unit Rx nb of the communication device 10b that the reception unit Rx1b received. The phase adjustment unit 32b provides a phase adjustment signal, which adjusts the phase of the clock signal, to the clock signal generating unit 34b.

In the communication device 12b in accordance with the second exemplary embodiment, the process of adjusting the phase of the signal which is to be transmitted from the transmission unit Tx nb is same as the process indicated in the flowchart in FIG. 2. In the communication device 10b in accordance with the second exemplary embodiment, the process of transmitting the BER in the reception unit Rx nb to the communication device 12b is same as the process indicated in the flowchart in FIG. 3. The error information table creation process in the phase adjustment unit 32b in accordance with the second exemplary embodiment is same as the process illustrated in the flowchart in FIG. 4.

As described above, according to the second exemplary embodiment, the communication device 12b is provided with reception units Rx1b, Rx2b, . . . , and Rx(n−1)b that receive signals transmitted from another communication device 10b via the transmission path 14b, the transmission unit Tx nb that transmits a signal to another communication device 10b via the transmission path 14b, error rate measurement units Er2b through Er(n−1)b that measure BERs, which represent probabilities of occurrence of errors in signals received by reception units Rx1a, Rx2a, . . . , and Rx(n−1)b in a case where the bi-directional communication with the communication device 10b is performed, and the phase adjustment unit 32b that adjusts the phase of the signal, which is to be transmitted from the transmission unit Tx nb to another communication device 10b, based on the BERs measured by error rate measurement units Er2b through Er(n−1)b. When a transmission error occurs because of a near-end crosstalk, the effect of a near-end crosstalk is suppressed by adjusting the phase of the signal transmitted by the transmission unit Tx tab based on BERs measured in channels as described in the second exemplary embodiment.

[Third Exemplary Embodiment]

Figure 9:
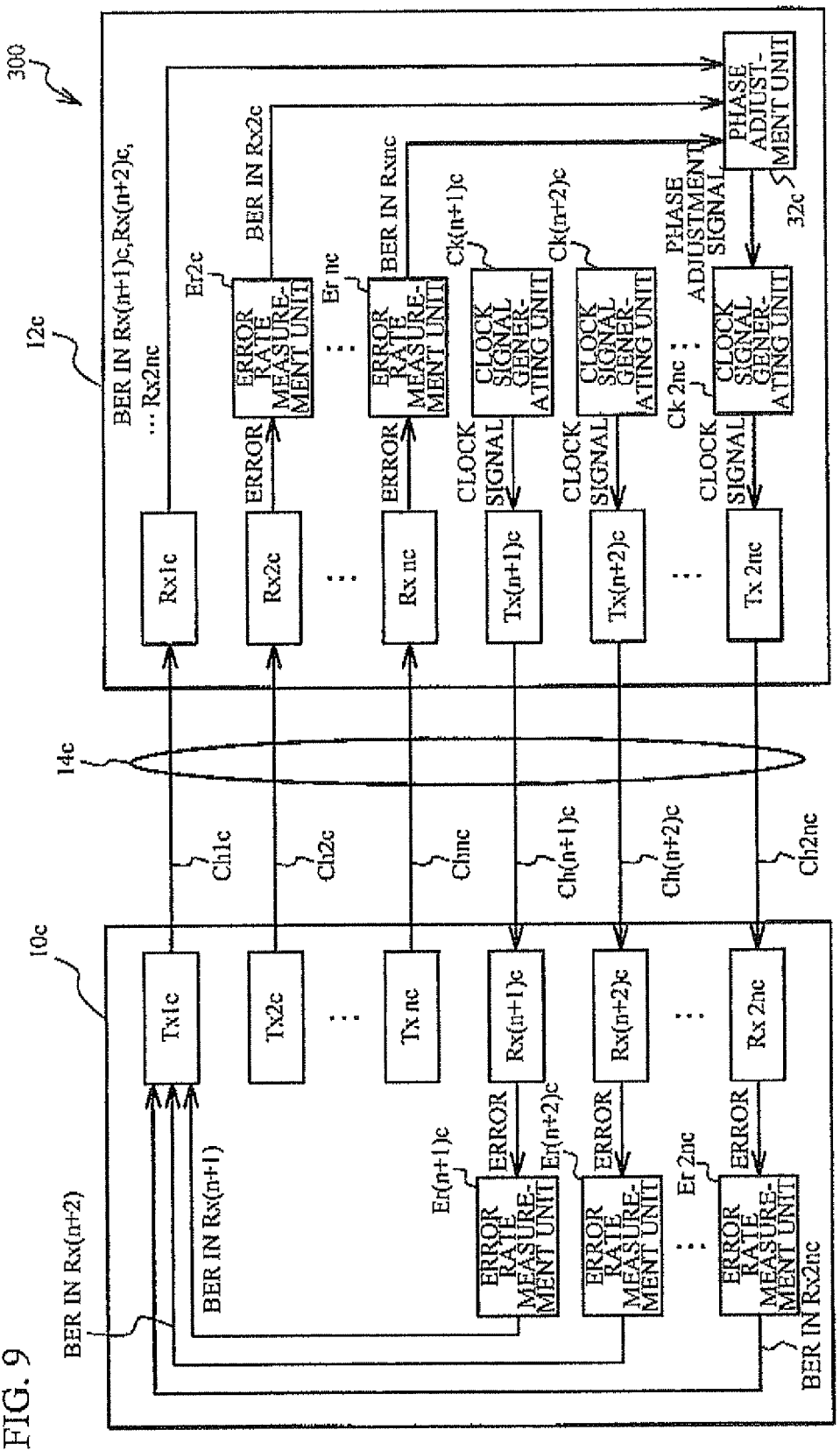
FIG. 9 is a block diagram illustrating a composition of a communication system in accordance with a third exemplary embodiment schematically.

FIG. 9 is a block diagram illustrating a composition of a communication system 300 in accordance with a third exemplary embodiment schematically. The communication system 300 is different from the communication system 100 and the communication system 200 in that the number of channels of the transmission path is 2n. Hereinafter, a description about the same composition as the composition already described in first and second exemplary embodiments will be omitted.

As described in FIG. 9, the communication system 300 is provided with a communication device 10c, a communication device 12c and a transmission path 14c. The transmission path 14c includes 2n-channels Ch1c, Ch2c, . . . , Ch(n+1)c and Ch 2nc.

The communication device 10c is provided with n-transmission units Tx1c, Tx2c, . . . , and Tx nc, n-reception units Rx(n+1)c, Rx(n+2)c, . . . , and Rx 2nc, and n-error rate measurement units Er(n+1)c, Er(n+2)c, . . . , and Er 2nc. Transmission units Tx1c, Tx2c, . . . , and Tx nc transmit signals to the communication device 12c via channels Ch1c, Ch2c, . . . , and Ch nc respectively. The transmission unit Tx1c transmits BERs in signals received by reception units Rx(n+1)c, Rx(n+2)c, . . . , and Rx 2nc to the communication device 12c. Reception units Rx(n+1)c, Rx(n−2)c, . . . , and Rx 2nc receive signals transmitted from the communication device 12c via channels Ch(n+1)c, Ch(n+2)c, . . . , and Ch 2nc respectively. Error rate measurement units Er(n+1)c, Er(n+2)c, . . . , and Er 2nc measure BERs in signals received by reception units Rx(n+1)c, Rx(n+2)c, . . . , and Rx 2nc in a case where the bi-directional communication with the communication device 12c is performed.

The communication device 12c is provided with n-reception units Rx1c, Rx2c, . . . , and Rx nc, n-transmission units Tx(n+1)c, Tx(n+2)c, . . . , and Tx 2nc, (n−1)-error rate measurement units Er2c through Er nc, a phase adjustment unit 32c, and n-clock signal generating units Ck(n+1)c, Ck(n−1−2)c, . . . , and Ck 2nc. Reception units Rx1c, Rx2c, and Rx nc receive signals transmitted from the communication device 10c via channels Ch1c, Ch2c, . . . , and Ch nc respectively. The reception unit Rx1c receives BERs in signals received by reception units Rx(n+1)c, Rx(n+2)c, . . . , and Rx 2nc of the communication device 10c from the communication device 10c. The transmission unit Tx 2nc transmits a signal to the communication device 100 via the channel Ch 2nc. Error rate measurement units Er2c through Er nc measure BERs in signals received by reception units Rx2c through Rx nc in a case where the bi-directional communication with the communication device 10c is performed. Clock signal generating units Ck(n+1)c, Ck(a+2)c, . . . , and Ck 2nc generate clock signals which function as a standard of timing at which transmission units Tx(n+1)c, Tx(n+2)c, . . . , and Tx 2n transmit signals, and provide clock signals to transmission units Tx(n+1)c, Tx(n+2)c, . . . , and Tx 2nc respectively. The phase adjustment unit 32c adjusts the phase of the signal, which is to be transmitted from the transmission unit Tx 2nc to the communication device 10e, based on BERs in reception units Rx2c through Rx nc that error rate measurement units Er2c through Er nc measured and BERs in reception units Rx(n+1)c, Rx(n+2)c, . . . , and Rx 2nc that the reception unit Rx1c received from the transmission unit Tx1c of the communication device 10c. The phase adjustment unit 32c provides a phase adjustment signal that adjusts the phase of the clock signal to the clock signal generating unit Ck 2nc.

In the communication device 12c in accordance with the third exemplary embodiment, the process of adjusting the phase of the signal transmitted from the transmission unit Tx 2nc is same as the process illustrated in the flowchart in FIG. 2. In the communication device 10c in accordance with the third exemplary embodiment, the process of transmitting BERs in reception units Rx(n+1)c, Rx(n+2)c, . . . , and Rx 2nc to the communication device 12c is same as the process illustrated in the flowchart in FIG. 3. The error information table creation process in the phase adjustment unit 32c in accordance with the third exemplary embodiment is same as the process illustrated in the flowchart in FIG. 4.

As described above, according to the third exemplary embodiment, the communication device 12c is provided with n-reception units Rx1c, Rx2c, . . . , and Rx nc that receive signals transmitted from another communication device 100 via the transmission path 14c, n-transmission units Tx(n+1)c, Tx(n+2)c, . . . , and Tx 2nc that transmit signals to another communication device 10c via the transmission path 14c, error rate measurement units Er2c through Er nc that measure BERs, which represent probabilities of occurrence of errors in signals received by reception unit Rx1c, Rx2c, . . . , and Rx nc, in a case where a bi-directional communication with the communication device 10c is performed, and the phase adjustment unit 32c that adjusts the phase of the signal, which is to be transmitted from the transmission unit Tx 2nc to another communication device 100, based on BERs measured by error rate measurement units Er2c through Er nc. When a transmission error occurs because of a near-end crosstalk, the effect of a near-end crosstalk is suppressed by adjusting the phase of the signal transmitted from the transmission unit Tx 2nc based on BERs measured in channels as described in the third exemplary embodiment. It may be possible to adjust the phase of the signal, which is to be transmitted from the transmission unit Tx 2nc to another communication device 10c by transmitting a phase adjustment signal from the phase adjustment unit 32c to the clock signal generating omit Ck 2nc and adjusting the phase of the clock signal as illustrated in FIG. 9. It may be possible to adjust phases of signals, which are to be transmitted from transmission units Tx(n+1)c, Tx(n+2)c, . . . , and Tx(2n−1)c other than the transmission unit Tx 2nc to another communication device 10c, by a phase adjustment signal from the phase adjustment unit 32c. In this case, the phase adjustment unit 32c may transmit a phase adjustment signal to clock signal generating units Ck(n+1)c, Ck(n+2)c, . . . , and Ck(2n−1)c, and adjust the phase of each clock signal.

[Fourth Exemplary Embodiment]

Figure 10:
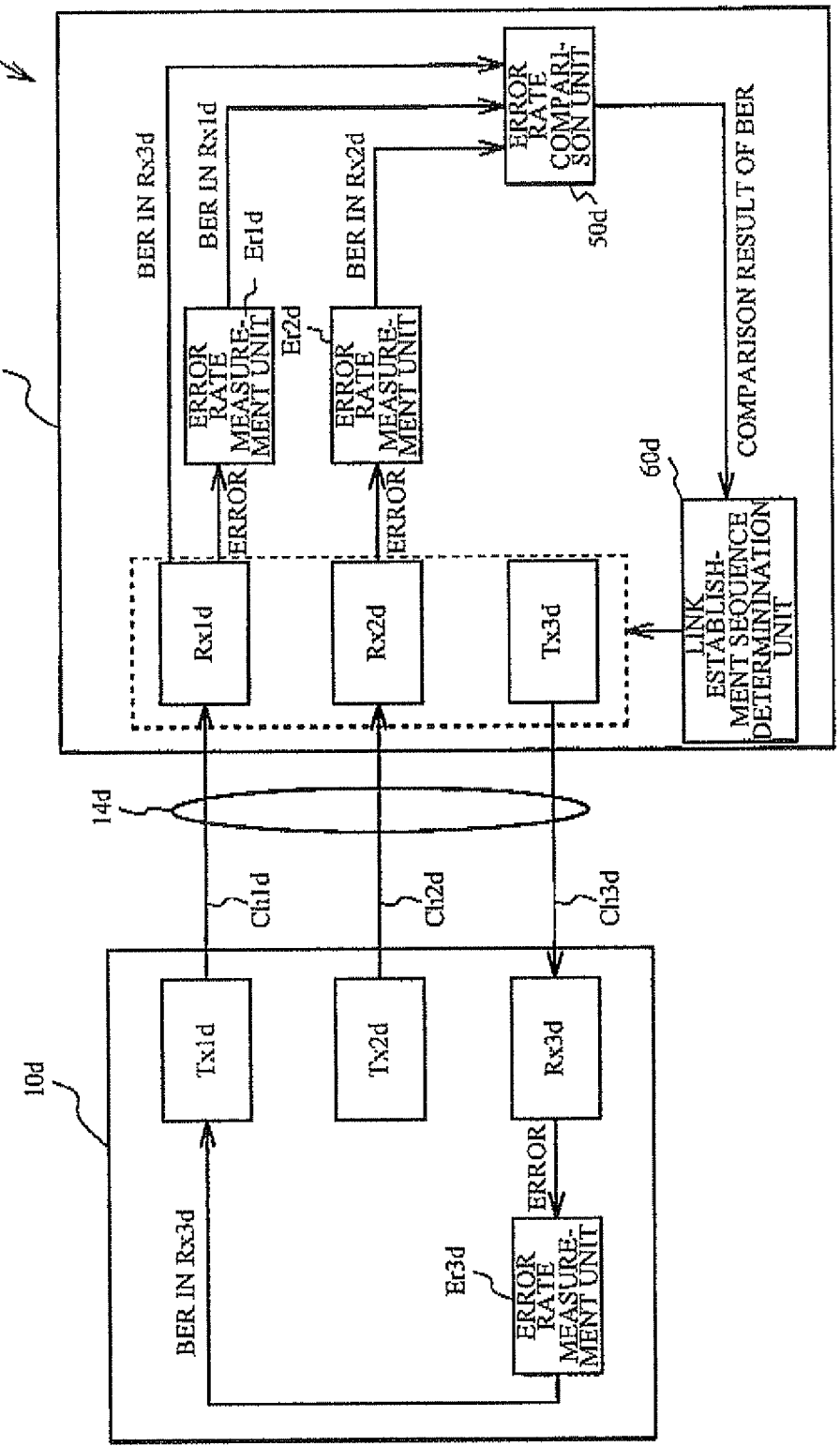
FIG. 10 is a block diagram illustrating a composition of a communication system in accordance with a fourth exemplary embodiment.

FIG. 10 is a block diagram illustrating a composition of a communication system 400 in accordance with a fourth exemplary embodiment. The communication system 400 is different from communication systems 100, 200 and 300 in that it determines the link establishment sequence by comparing BERs measured in channels in a case where the BER of each channel of the transmission path is not preliminarily known. FIG. 10 illustrates a case where the number of channels is 3, which is same as that of the communication system 100. Hereinafter, a description about the same composition as the composition described in first, second and third exemplary embodiments will be omitted.

As illustrated in FIG. 10, the communication system 400 is provided with a communication device 10d, a communication device 12d, and a transmission path 14d. The transmission path 14d couples the communication device 10d with the communication device 12d. The transmission path 14a includes three channels Ch1d, Ch2d and Ch3d.

The communication device 10d is provided with transmission units Tx1d and Tx2d, a reception unit Rx3d, and an error rate measurement unit Er3d. Transmission units Tx1d and Tx2d transmit signals to the communication device 12d via channels Ch1d and Ch2d respectively. The transmission unit Tx1d transmits the BER in a signal received by the reception unit Rx3d of the communication device 10a to the communication device 12d. The reception unit Rx3d receives a signal transmitted from the communication device 12d via the channel Ch3d. The error rate measurement unit Er3d measures the BER in a signal received by the reception unit Rx3d in a case where a bi-directional communication with the communication device 12d is performed.

The communication device 12d is provided with reception units Rx1d and Rx2d, a transmission unit Tx3d, error rate measurement units Er1d and Er2d, an error rate comparison unit 50d, and a link establishment sequence determination unit 60d. Reception units Rx1d and Rx2d receive signals transmitted from the communication device 10d via channels Ch1d and Ch2d respectively. The reception unit Rx1d receives the BER in a signal received by the reception unit Rx3d of the communication device 10d from the communication device 10d. The transmission unit Tx3d transmits a signal to the communication device 10d via the channel Ch3d. The error rate measurement unit Er3d measures the BER in a signal received by the reception unit Rx2d in a case where the bi-directional communication with the communication device 10d is performed. The error rate comparison unit 50d compares BERs in reception units Rx1d, Rx2d and Rx3d, and notifies the rink establishment sequence determination unit 60d of a comparison result. The link establishment sequence determination unit 60d determines the link establishment sequence based on the comparison result of BERs notified from the error rate comparison unit 50d. The link establishment sequence determination unit 60d controls reception units Rx1d and Rx2d and the transmission unit Tx3d so that the link establishment of channels is carried out in ascending order of the BER.

Figure 11:
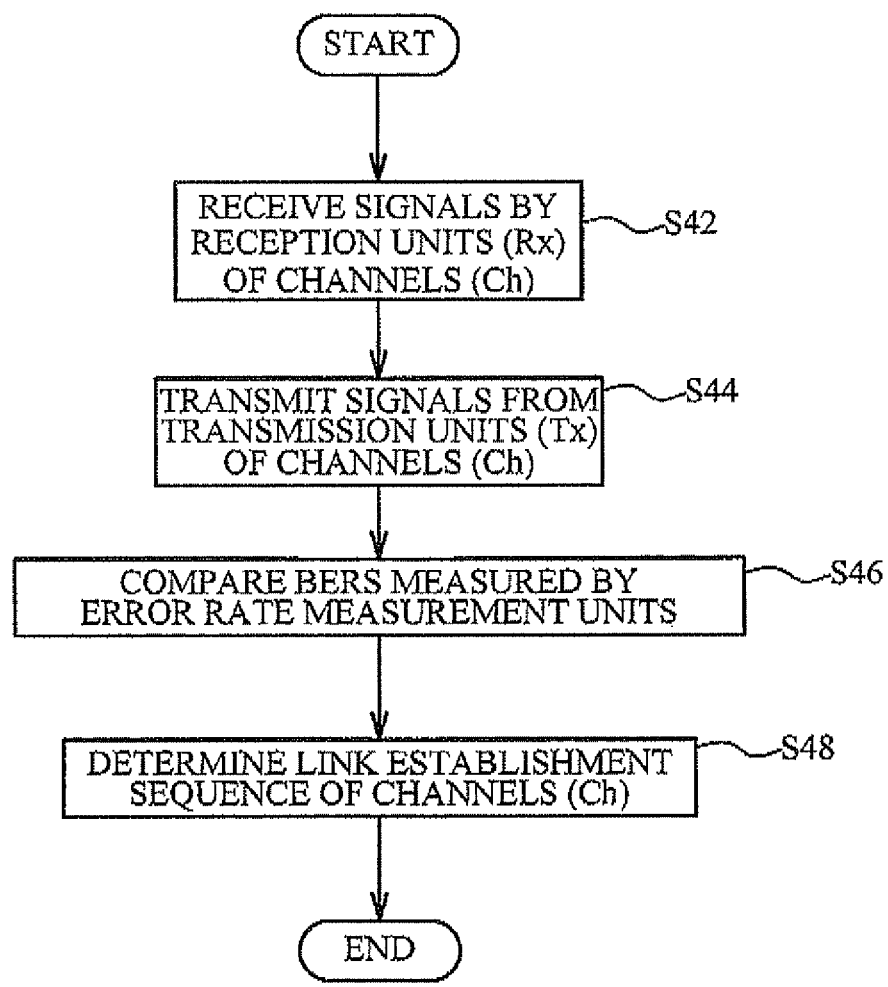
FIG. 11 is a flowchart illustrating a process of determining a link establishment sequence in a communication device in accordance with the fourth exemplary embodiment.

FIG. 11 is a flowchart illustrating a process of determining the link establishment sequence in the communication device 12d in accordance with the fourth exemplary embodiment. As illustrated in FIG. 11, signals are received by reception units Rx1d and Rx2d of respective channels (step S42). Assume that transmission units Tx1d and Tx2d of the communication device 10d are transmitting signals to reception units Rx1d and Rx2d respectively at the timing of the step S42. Then, signals are transmitted by transmission units of respective channels (step S44). In FIG. 11, the transmission unit Tx3d transmits a signal. Assume that the reception unit Rx3d of the communication device 10c1 is receiving a signal from the transmission unit Tx3d at the timing of the step S44. The error rate comparison unit 50d compares BERs measured by error rate measurement units (step S46), and notifies the link establishment sequence determination unit 60d of the comparison result. The link establishment sequence determination unit 60d determines the link establishment sequence based on the comparison result of BERs notified from the error rate comparison unit 50d (step S48).

As described above, in the fourth exemplary embodiment, a description was given of a case where error rate measurement units Er1d and Er2d include the error rate comparison unit 50d that measures respective error rates in reception units Rx1d and Rx2d, and compares error rates, and the link establishment sequence determination unit 60d that determines the link establishment sequence between reception units Rx1d and Rx2d and the transmission unit Tx3d and another communication device 10d based on the comparison result by the error rate comparison unit 50d. When the effect of a near-end crosstalk in each channel is not known preliminarily, communication devices become able to communicate with each other by determining the link establishment sequence as described in the fourth exemplary embodiment. The effect of a near-end crosstalk is suppressed and the transmission error is reduced by adjusting the phase of the signal transmitted from the transmission unit as described in first, second and third exemplary embodiments for example after the above link establishment.

[Fifth Exemplary Embodiment]

Figure 12:
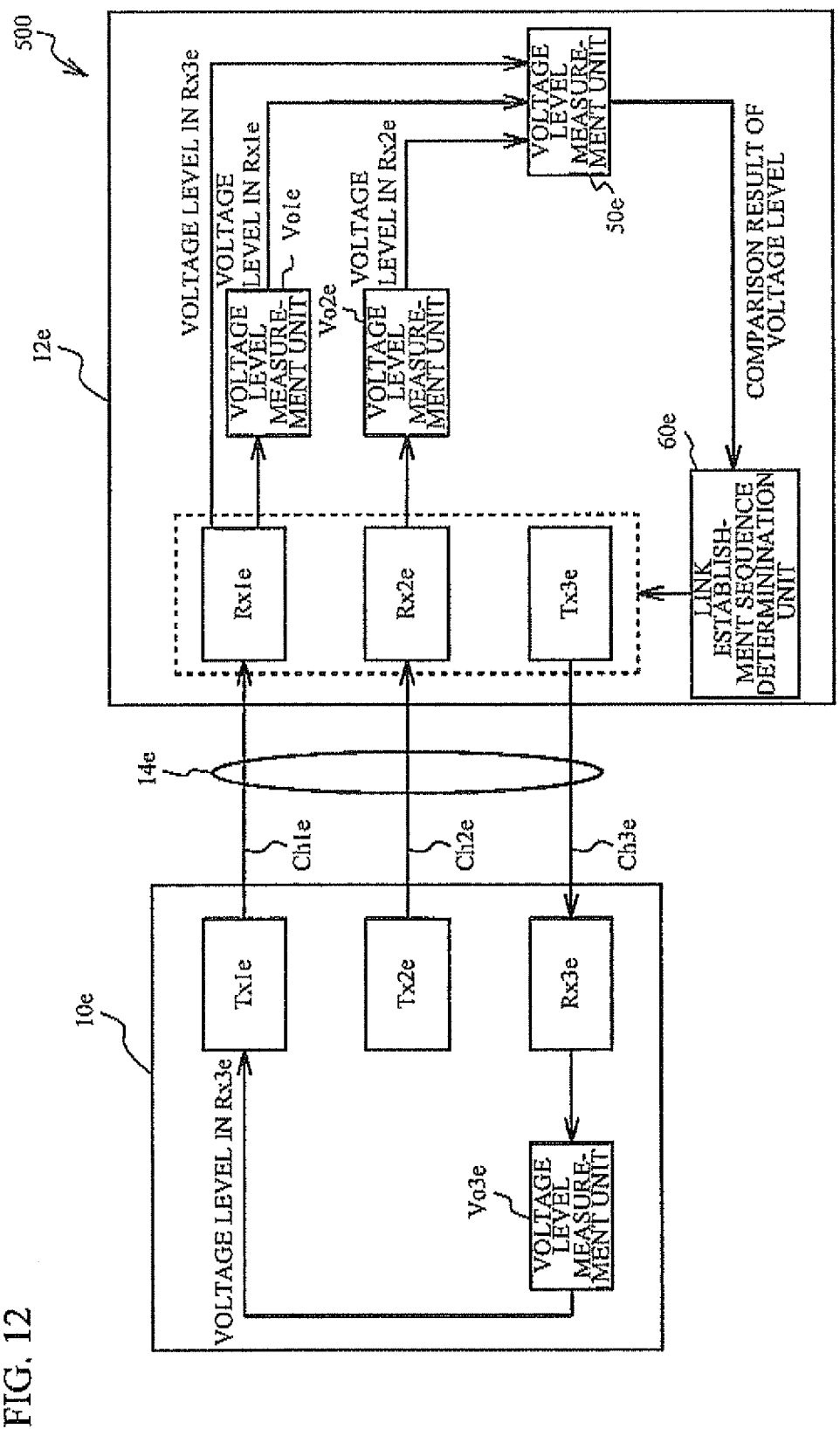
FIG. 12 is a block diagram illustrating a communication system in accordance with a fifth exemplary embodiment.

FIG. 12 is a block diagram illustrating a composition of a communication system 500 in accordance with a fifth exemplary embodiment. The communication system 500 determines the link establishment sequence in the same manner as the communication system 400, but is different from the communication system 400 in that it determines the link establishment sequence based on the level of the signal in the reception unit not based on the BER in the reception unit.

As described in FIG. 12, the communication system 500 is provided with a communication device 10e, a communication device 12; and a transmission path 14e. The communication device 10e is provided with transmission units Tx1e and Tx2e, a reception unit Rx3e, and a voltage level measurement unit Vo3e. Transmission units Tx1e and Tx2e transmit signals to the communication device 12e via channels Ch1e and Ch2e respectively. The transmission unit Tx1e transmits the voltage level of the signal in the reception unit Rx3e measured by the voltage level measurement unit Vo3e to the communication device 12e. The reception unit Rx3e receives a signal transmitted from the communication device 12e via the channel Ch3e. The voltage level measurement unit Vo3e measures the voltage level of the signal received by the reception unit Rx3e in a case where the bi-directional communication with the communication device 12e is performed.

The communication device 12e is provided with reception units Rx1e and Rx2e, a transmission unit Tx3e, voltage level measurement units Vo1e and Vo2e, a voltage level comparison unit 50e, and a link establishment sequence determination unit 60e. Reception units Rx1e and Rx2c receive signals transmitted from the communication device 10e via channels Ch1e and Ch2e respectively. The reception unit Rx1e receives the voltage level of the signal received by the reception unit Rx3e of the communication device 10e from the communication device 10e. The transmission unit Tx3e transmits a signal to the communication device 100 via the channel Ch3e. Voltage level measurement units Vo1e and Vo2e measure voltage levels of signals received by reception units Rx1e and Rx2e in a case where the bi-directional communication with the communication device 10e is performed. The voltage level comparison unit 50e compares voltage levels of signals in reception units Rx1e, Rx2e and Rx3e, and notifies the link establishment sequence determination unit 60e of the comparison result. The link establishment sequence determination unit 60e determines the link establishment sequence based on the comparison result of voltage levels of signals notified from the voltage level comparison unit 50e. The link establishment sequence determination unit 60d controls reception units Rx1e and Rx2e and the transmission unit Tx3e so that the link establishment of channel is carried out in ascending order of the voltage level.

Figure 13:
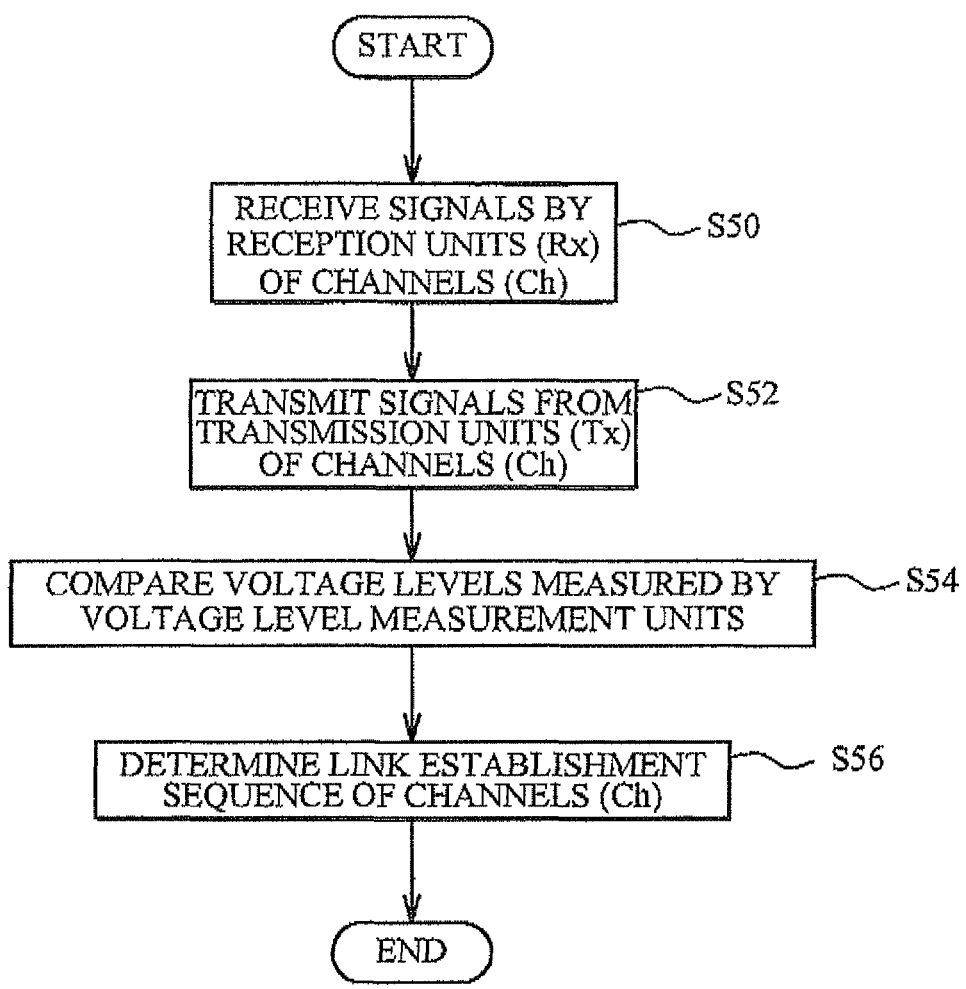
FIG. 13 is a flowchart illustrating a process of determining a link establishment sequence in a communication device in accordance with the fifth exemplary embodiment.

FIG. 13 is a flowchart illustrating a process of determining the link establishment sequence in the communication device 12e in accordance with the fifth exemplary embodiment. As the step S50 and the step S52 are same procedures as the steps S42 and S44 in FIG. 11, a description will be omitted. The voltage level comparison unit 50e compares voltage levels of signals measured by voltage level measurement units (step S54), and notifies the link establishment sequence determination unit 60e of the comparison result. The link establishment sequence determination unit 60e determines the link establishment based on the comparison result voltage levels of signals notified from the voltage level comparison unit 50e (step S56).

Figure 14A:
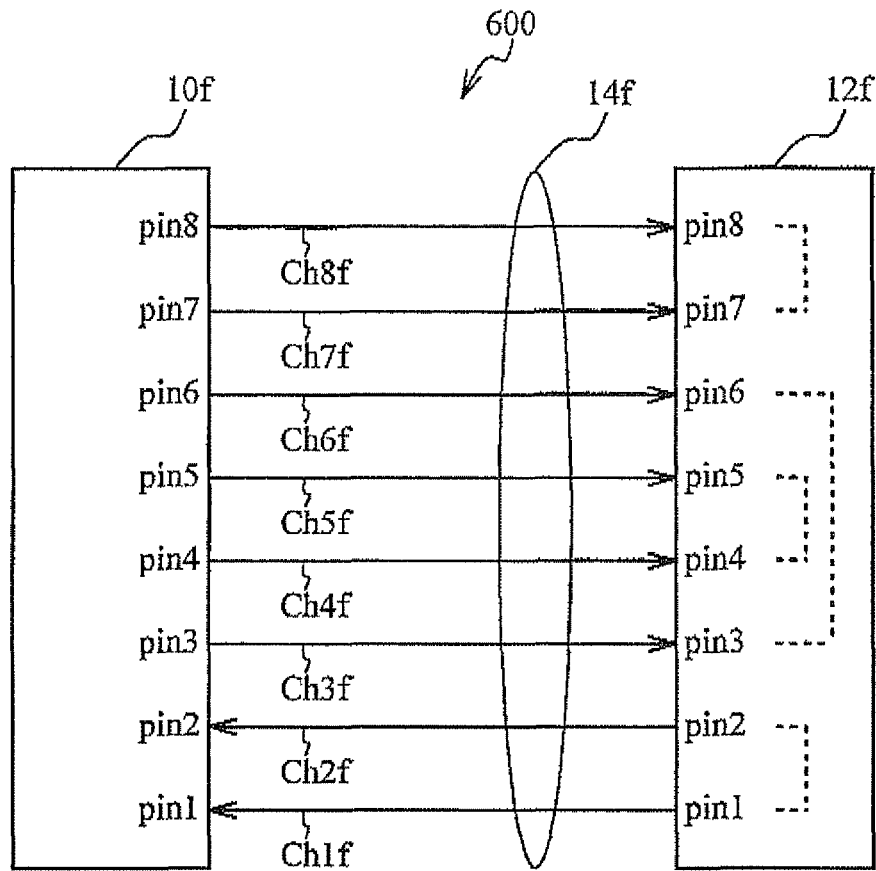
FIG. 14A is a diagram illustrating an example of respective transmission directions of signals of channels in the communication system in accordance with the fifth exemplary embodiment.
Figure 14B:
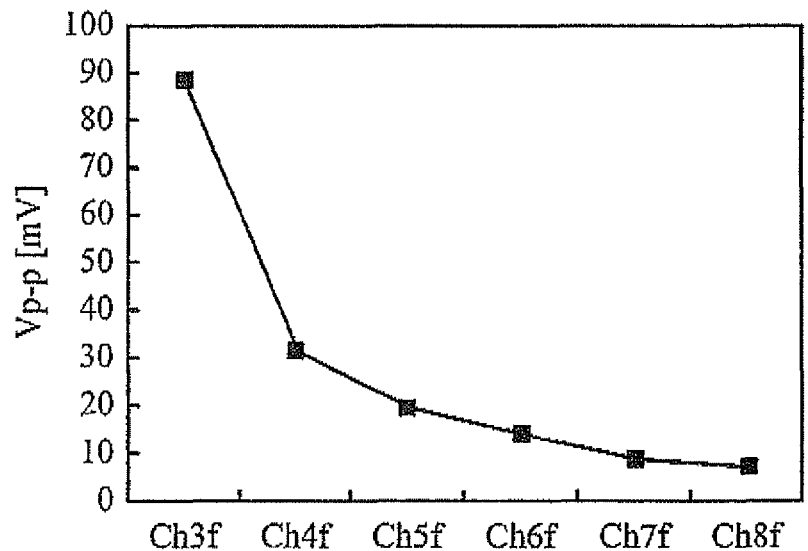
FIG. 14B is a graph illustrating a result of measurement of voltage levels of signals of channels in the communication system in accordance with the fifth exemplary embodiment.

Referring to FIG. 14A and FIG. 14B, a description will now be given of a measurement result of voltage levels of signals of channels in the communication system 600 in accordance with the fifth exemplary embodiment.

FIG. 14A is a diagram illustrating respective transmission directions of signals of channels in the communication system 600 in accordance with the fifth exemplary embodiment. The communication system 600 is provided with communication devices 101 and 121, and a transmission path 141. The transmission path 14f couples the communication device 101 with the communication device 12f. The transmission path 141 includes eight channels Ch1f, Ch2f, Ch3f, Ch4f, Ch5f, Ch6f, Ch7f and Ch8f. Channels are coupled to pins provided to connectors of communication devices 10f and 12f, and channels neighboring each other in FIG. 14A are neighboring each other physically. In channels Ch1f and Ch2f, signals are transmitted from the communication device 12f to the communication device 10f. In channels Ch3f, Ch4f, Ch5f, Ch6f, Ch7f and Ch8f, signals are transmitted from the communication device 10f to the communication device 12f. In channels Ch1f and Ch2f, signals are transmitted by a differential transmission system. In the same manner, channels Ch3 and Ch6, channels Cb4 and Ch5, and channels Ch7 and Ch8 transmit signals by a differential transmission system.

FIG. 14B is a graph illustrating a result of measurement of voltage levels of signals in channels in the communication device 12f in accordance with the fifth exemplary embodiment. In FIG. 14B, a vertical axis represents a peak to peak voltage level [mV], and a horizontal axis represents the reference number of channel. FIG. 14B illustrates voltage levels measured in channels Ch3f, Ch4f, Ch5f, Ch6f, Ch7f and Ch8f of the communication device 121 in a case where the transmission path 141 transmits signals with a transmission rate of 4.25 Gbps and a voltage level of 1000 mV to channels Ch1f and Ch2f by using a category 7 cable with a length of 10 m. As seen from FIG. 14B, as the channel is closer to channels Ch1f and Ch2f physically, the voltage level of the signal becomes larger because of the effect of a near-end crosstalk.

Figure 15:
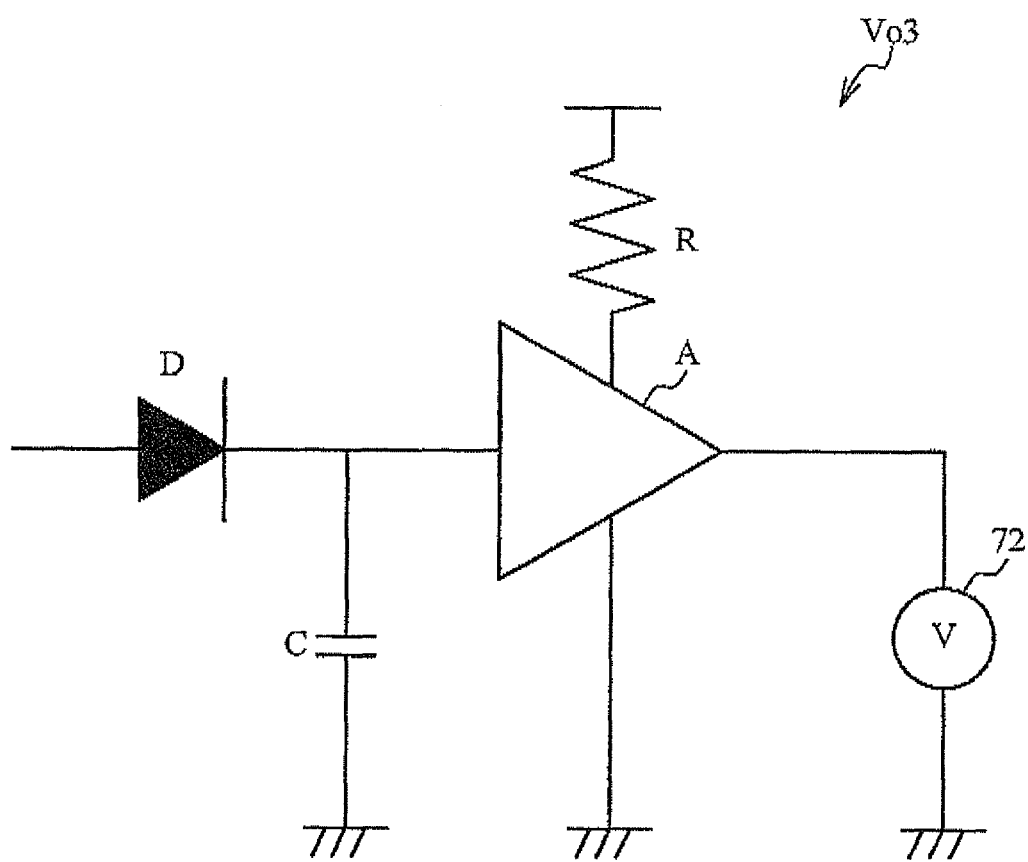
FIG. 15 is a circuit diagram illustrating a composition of a voltage level measurement circuit which is an example of a voltage level measurement unit in accordance with the fifth exemplary embodiment.

FIG. 15 is a circuit diagram illustrating a composition of a voltage level measurement circuit which is an example of the voltage level measurement unit in accordance with the fifth exemplary embodiment. A voltage level measurement circuit Vo3 is provided with a diode D, a capacitor C, a resistance R, an operation amplifier A, and a voltmeter 72. A signal received by the reception unit is input to an anode of the diode D. A cathode of the diode D is coupled to the input of the operation amplifier A. One end of the capacitor C is coupled to the cathode of the diode D, and the other end is connected to ground. The resistance R is couple to the operation amplifier A, and a voltage level of reference input of the operation amplifier A is determined based on the resistance value of the resistance R. The operation amplifier A compares the voltage level of the input signal with the voltage level of the reference input. The operation amplifier A outputs the comparison result to the voltmeter 72. The voltage level of the signal is measured by measuring the voltage level by the voltmeter 72 while adjusting the resistance value of the resistance R.

As described above, in the fifth exemplary embodiment, a description was given of a case where voltage level measurement units Vo1e and Vo2e that measure voltage levels of signals received by reception units Rx1d and Rx2d respectively, the voltage level comparison unit 50e that compares voltage levels of signals, and a link establishment sequence determination unit 60e that determines the link establishment sequence between reception units Rx1d and Rx2d and the transmission unit Tx3e and another communication device 10e based on the comparison result by the voltage level comparison unit 50e are provided. When the effect of a near-end crosstalk in each channel is not known preliminarily, communication devices become able to communicate with each other by determining the link establishment sequence as described in the fifth exemplary embodiment. The effect of a near-end crosstalk is suppressed and the transmission error is reduced by adjusting the phase of the signal transmitted by the transmission unit as described in the first, second and third exemplary embodiments for example after the above link establishment. The voltage level measurement unit is an example of a signal level measurement unit that measures a level of a signal, and the current level may be measured instead for example. The voltage level comparison unit is an example of a signal level comparison unit that compares levels of signals, and current levels may be compared instead, for example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A communication device comprising:
   a reception unit that receives a signal transmitted from another communication device via a transmission path;
   a transmission unit that transmits a signal to the another communication device via the transmission path;
   an error rate measurement unit that measures an error rate representing a probability of occurrence of errors in a signal received by the reception unit in a case where a bi-directional communication with the another communication device is performed; and
   a phase adjustment unit that adjusts a phase of a signal transmitted from the transmission unit to the another communication device based on an error rate measured by the error rate measurement unit, wherein
   the error rate measurement unit measures error rates in the signal received by the reception unit with respect to phases adjusted by the phase adjustment unit, and
   the phase adjustment unit selects a first phase that makes each of the error rates equal to or smaller than a given value among phases, and adjusts the phase of the signal transmitted from the unit to the another communication device to the first phase.

2. The communication device according to claim 1, wherein the reception unit receives an error rate in a signal received by the another communication device from the another communication device, and
   the phase adjustment unit adjusts the phase of the signal transmitted from the transmission unit to the another communication device based on the error rate measured by the error rate measurement unit and the error rate in the signal received by the another communication device.

3. The communication device according to claim 1, wherein the transmission unit includes a clock signal generating unit that generates a clock signal which functions as a standard of a timing at which the transmission unit transmits a signal, and
   the phase adjustment unit adjusts the phase of the signal transmitted from the transmission unit to the another communication device by adjusting a phase of the clock signal.

4. The communication device according to claim 1, wherein the reception unit includes a plurality of reception portions,
   the transmission unit includes a plurality of transmission portions, and
   the error rate measurement unit includes:
      an error rate comparison unit that measures respective error rates in the plurality of reception portions, and compares the error rates; and
      a link establishment sequence determination unit that determines a sequence to establish a link between the plurality of reception portions and the plurality of transmission portions and the another communication device based on a result of a comparison by the error rate comparison unit.

5. The communication device according to claim 1, further comprising:
   a signal level measurement unit;
   a signal level comparison unit; and
   a link establishment sequence determination unit, wherein
   the reception unit includes a plurality of reception portions,
   the transmission unit includes a plurality of transmission portions,
   the signal level measurement unit measures levels of signals received by the plurality of reception portions,
   the signal level comparison unit compares the levels of the signals, and
   the link establishment sequence determination unit determines a sequence of establishing a link between the plurality of reception portions and the plurality of transmission portions and the another transmission device based on a result of a comparison by the signal level comparison unit.

6. A communication system comprising:
   a first communication device;
   a second communication device; and
   a transmission path that couples the first communication device with the second communication device, and through which the first communication device and the second communication device transmit signals bi-directionally;
   the first communication device including:
      a first reception unit that receives a signal transmitted from the second communication device via the transmission path;
      a first error rate measurement unit that measures a first error rate representing a probability occurrence of errors in a signal received by the first reception unit in a case where a bi-direction communication with the second communication device is performed; and
      a first transmission unit that transmits a signal and the first error rate to the second communication device via the transmission path; and
   the second communication device including:
      a second reception unit that receives the signal and the first error rate transmitted from the first communication device via the transmission path;
      a second transmission unit that transmits the signal to the first communication device via the transmission path;
      a second error rate measurement unit that measures a second error rate representing a probability of occurrence of errors in a signal received by the second reception unit in a case where a bi-directional communication with the first communication device is performed; and a phase adjustment unit that adjusts a phase of a signal transmitted from the second transmission unit to the first communication device based on the first error rate and the second error rate.

7. The communication device according to claim 1, wherein the transmission path includes at least three channels, and a first number of channels in the transmission path that transmit the signal transmitted from the another communication device to the reception unit is different from a second number of channels in the transmission path that transmits the signal from the transmission unit to the another communication device.

8. The communication device according to claim 7, wherein one of the first channels physically neighbors one of the second channels.

9. A non-transitory computer readable medium storing a program that causes a computer to execute a communication process, the communication process comprising:

receiving a signal transmitted from another communication device via a transmission path;

transmitting a signal to the another communication device via the transmission path;

measuring an error rate representing a probability of occurrence of errors in a signal received when a bi-directional communication with the another communication device is performed; and adjusting a phase of a signal transmitted to the another communication device based on the error rate, wherein error rates in the signal received are measured with respect to the phase adjusted, and adjusting a phase includes selecting a first phase that makes each of the error rates equal to or smaller than a given value among phases, and adjusting the phase of the signal transmitted to the another communication device to the first phase.

* * * * *